Aug. 27, 1963        H. W. KELSO ETAL        3,101,581
MACHINE FOR HARVESTING WASTE COTTON FROM THE GROUND
Filed May 25, 1962
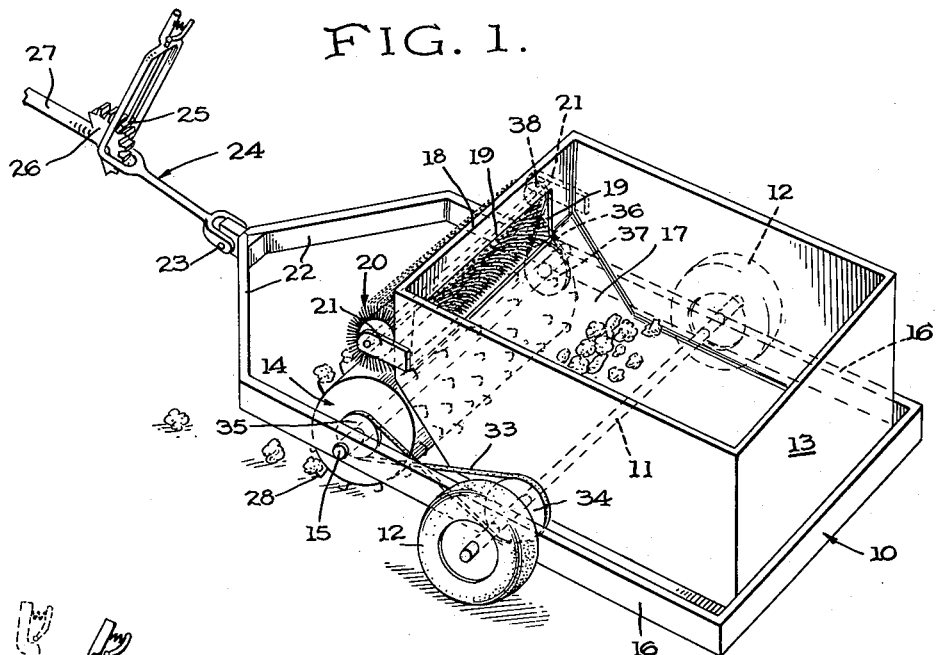
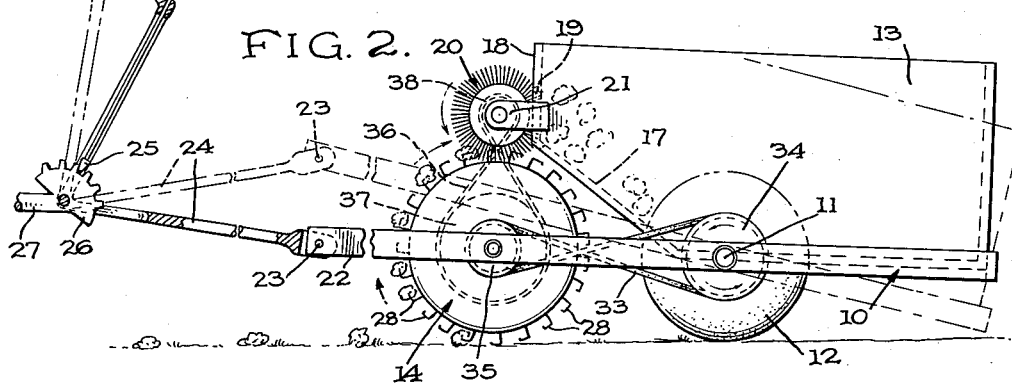
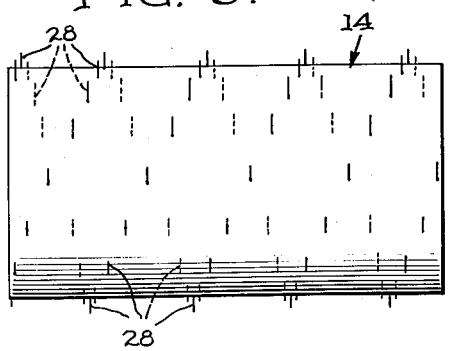
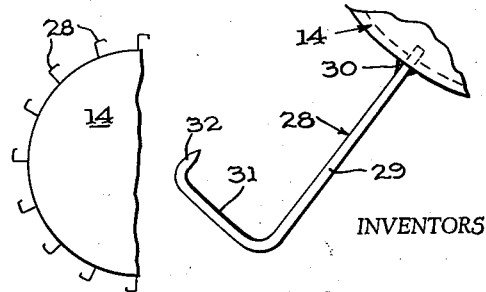
INVENTORS
GEORGE E. SWIM
HOYTTE W. KELSO
BY
B. P. Fishburne, Jr.
ATTORNEY

United States Patent Office 3,101,581
Patented Aug. 27, 1963

3,101,581
MACHINE FOR HARVESTING WASTE COTTON
FROM THE GROUND
Hoytte W. Kelso, 840 Wildwood Drive, and George E. Swim, 3608 Rojo Court, both of Corpus Christi, Tex.
Filed May 25, 1962, Ser. No. 197,645
3 Claims. (Cl. 56—28)

This invention relates to a machine for harvesting waste or "down" cotton from the ground subsequent to the original harvesting.

Waste or "down" cotton is difficult and expensive to pick up by hand, and much valuable cotton of this type is lost and never recovered because entirely satisfactory machines for this purpose have not heretofore been devised. Waste cotton salvaging machines are known, but these machines are complicated and generally quite expensive and a prime difficulty therewith resides in the fact that they tend to pick up not only the waste cotton but also much debris and foreign matter which must ultimately be separated from the cotton. For these and other reasons, prior art waste cotton salvaging machines have not proven to be satisfactory.

It is therefore the object of this invention to provide a highly simplified and inexpensive machine for salvaging or harvesting waste cotton from the ground after the original picking of the cotton, and which machine is very efficient in operation and tends to pick up clean cotton which is relatively free from debris and to sweep aside or reject the debris.

More specifically, an object of the invention is to provide a waste cotton salvage machine having novel cotton impaling elements mounted upon a drum or cylinder in such a manner that all salvageable cotton along and in between rows will be impaled and picked up while the unwanted debris is swept aside due to the construction of the impaling elements and their disposition in a spiral pattern upon the drum.

Another object is to provide a waste cotton salvaging machine of the mentioned character having a drum with cotton pick-up elements to traverse the ground between rows of cotton stalks and which machine may operate between two rows or four or more rows, if desired, by providing additional pick-up drums side-by-side or abreast on the machine frame. The accompanying drawings illustrate a single pick-up unit only for the sake of simplicity.

A further object is to provide a machine of the above-mentioned character which harvests the waste cotton from virtually every inch of the ground area between rows so that no useful cotton will fail to be recovered.

Other objects and advantages of the invention will be apparent during the course of the following detailed description.

In the accompanying drawings forming a part of this application and in which like numerals are employed to designate like parts throughout the same, FIGURE 1 is a perspective view of a machine for harvesting waste cotton in accordance with the invention, FIGURE 2 is a side elevation of the machine, FIGURE 3 is a side elevation of the harvesting drum employed upon the machine, FIGURE 4 is a fragmentary end elevation of the same, and FIGURE 5 is an enlarged fragmentary end elevation of the drum showing the construction and mounting of one cotton impaling element.

In the drawings, wherein for the purpose of illustration is shown a preferred embodiment of the invention, the numeral 10 designates a horizontal generally rectangular rigid frame supported upon a suitable transverse axle 11 having ground-engaging traction wheels 12 arranged outboard of the sides of frame 10. The frame 10 extends forwardly and rearwardly of the axle 11 for substantial distances and has suitably mounted thereon at the rear and central portion thereof a box or hopper 13 for the cotton to be harvested.

Forwardly of the box 13 a relatively large harvesting cylinder or drum 14 is journaled for rotation upon a transverse horizontal shaft 15, in turn suitably mounted upon the side members 16 of frame 10. The hopper 13 has a forward inclined wall portion 17 above and close to the rear upper portion of drum 14, so that the forward end of the hopper partially overlies the harvesting drum. The hopper has a front vertical wall portion 18 above and forwardly of the inclined wall portion 17 and provided with a transverse slot 19 through which the salvaged cotton passes into the hopper 13, as will be further described.

Immediately above the drum 14, a horizontal cylindrical brush 20 having wire bristles or the like is journaled for rotation upon brackets 21 secured rigidly to the front of the hopper adjacent opposite sides thereof. The brush 20 is of considerably smaller diameter than the harvesting drum 14, as shown. The drum 14 may be about 18 inches in diameter although its size may vary somewhat in accordance with local ground conditions, the distance between rows and like factors. The relative sizes of the harvesting drum 14 and the rotary brush 20 and the other elements of the invention are shown approximately in the drawings.

Forwardly of the drum 14, the support frame 10 includes forwardly converging arms 22, pivotally attached at 23 to an L-shaped control lever or bell crank 24 having a retractable dog 25 to engage a toothed sector 26 adjustably for raising and lowering the forward end of the frame 10 and thereby adjusting the height of the drum 14 relative to the ground between adjacent rows of cotton stalks. The sector 26 is rigidly secured to any conventional hitch means 27, leading to and connected with a tractor drawbar or the like, not shown. The hitch means 27 is substantially rigid with the tractor or like towing vehicle, whereby pivotal movement of the bell crank 24 relative to the sector 26 serves to raise and lower the forward end of the frame 10, the latter rocking upon the support wheels 12.

The harvesting or pick-up drum 14 which forms the heart of the invention has mounted thereon in a continuous spiral pattern, FIGURE 3, a multiplicity of cotton impaling or pick-up elements 28. Each pick-up element 28 is formed of relatively stiff wire and is generally L-shaped, FIGURE 5, including a relatively long straight arm 29, anchored at 30, within a small opening in the periphery of drum 14, by brazing, welding or the like. The arm 29 of each element 28 projects readially of the drum periphery for a distance of about 2 or 2½ inches. Each element 28 includes at the outer end of radial arm 29 a transverse relatively shorter extension 31, at right angles to the arm 29, and extending parallel to the peripheral surface of the drum 14 and spaced therefrom and facing in the direction of rotation of the drum, FIGURE 2. The extension 31 may be about one inch long. At the leading end of the extension 31, each impaling element 28 has a short radially inwardly directed impaling or pick-up point 32 facing toward the periphery of the drum and spaced therefrom. The elements 28 project equidistantly from the drum periphery and the elements are equidistantly spaced about three inches apart in the continuous spiral row of the elements upon the drum. The pitch of the spiral row of pick-up elements is such that there is only about one inch axially of the drum between adjacent elements 28 in the spiral row of elements. By virtue of this arrangement, the area of the ground traversed by the machine is completely processed by the cotton salvaging drum 14 and it is almost impossible for the waste cotton to escape being impaled by one of the elements 28 and therefore picked up by the drum.

Due to the fluffy and loose fibrous nature of the "down" cotton, the inwardly directed impaling points 32 will always snag or impale each particle of cotton adjacent the bottom of the drum and carry the cotton upwardly around the forward side of the drum toward the rotary brush 20. However, the arrangement of the inwardly directed points 32 and the blunt transverse extension 31 radially outwardly thereof will cause the elements 28 to reject or cast aside debris, trash, foliage and other foreign matter. In other words, the impaling elements 28 are specifically designed so that they will not impale and pick up any and everything on the ground in the path of movement of the drum 14, but only the cotton which, due to its fibrous nature, will be impaled by the elements 28 while other material is rejected, as stated. Additionally, the spiral arrangement of the elements 28 on the drum will cause the row of elements during rotation of the drum to produce a sweeping action transversely of the line of movement of the machine, and this sweeping action further tend to sweep all debris toward one side of the machine and away from the cotton which is being harvested or salvaged. The sweeping action has the effect of separating debris and foreign matter including dirt from the cotton which is being picked up.

In order to cause the drum 14 to rotate clockwise, FIGURE 2, or opposite to the direction of movement of the machine, a crossed belt 33 engages a relatively large pulley 34 on the traction wheel axle 11, and a second relatively small pulley 35 on the drum 14 or drum axle. The drum 14 rotates at a peripheral speed which is greater than the forward speed of the machine being towed by a tractor or the like. That is to say, the impaling elements 28 at the bottom of the drum 14 move relative to the ground and cotton at a greater speed than the forward speed of the machine.

A second crossed belt 36 engages a second relatively large pulley 37 on the remote end of the drum 14 and also engages a relatively small pulley 38 on the axle of the brush 20. This causes the brush 20 to rotate in the opposite direction from the drum 14 and at a greater speed of rotation than the drum. The bristles of the rotary brush 20 intermesh with the impaling elements 28 and clear the harvested cotton from the elements 28 at the top of the drum 14 and cast the cotton through the opening 19 and into the storage hopper 13 of the machine.

As previously stated, the elevation of the drum 14 relative to the ground may be adjusted by means of the bell crank 24, thus enabling the elements 28 to run very close to the ground without engaging or digging into the ground. As the machine traverses the rows of cotton stalks, all of the salvageable cotton is picked up, substantially free of foreign matter, and conveyed upwardly by the drum 14 and then discharged cleanly by the brush 20 into the hopper 13 so that the harvesting or salvaging operation is a continuous process until the hopper 13 is filled.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A "down" cotton harvesting machine comprising a wheeled frame adapted to be drawn along rows of cotton stalks, a hopper on said frame to receive cotton harvested from the ground, a rotary drum journaled upon said frame near the forward end of the hopper, a rotary brush arranged near the top of said drum, means to rotate said drum oppositely to the direction of movement of the wheeled frame and to rotate said brush oppositely to the direction of rotation of the drum, and a continuous spiral row of cotton impaling elements on said drum in uniformly spaced relation and including parts projecting radially of the drum and anchored thereto, transverse parts spaced from the periphery of the drum and substantially parallel therewith and extending in the direction of rotation of the drum and inwardly radially extending cotton impaling points on said transverse parts facing the periphery of the drum and spaced therefrom, said impaling points being in spaced substantially parallel relation to the radially projecting parts of the cotton impaling elements, whereby only relatively clean cotton free of debris is picked up by the drum and conveyed to said brush, said brush removing the cotton from the impaling elements and casting it into said hopper, said hopper having an opening adjacent said brush.

2. A machine for harvesting waste cotton from the ground comprising a support frame, a single pair of traction wheels carrying the support frame intermediate its ends and rendering the support frame rockable, adjustable hitch means for the forward end of the support frame enabling said forward end to be raised and lowered, said hitch means comprising a generally L-shaped control member pivotally connected by one leg thereof to said support frame, the other leg of said L-shaped control member including a retractable dog, hitch means on said tractor having a toothed sector on the free end thereof engageable by said dog to adjustably position said support frame relative to the ground, a cotton pick-up drum journaled upon the support frame between the traction wheels and hitch means and having substantially L-shaped cotton impaling elements arranged in a spiral row on the periphery of the drum, gearing interconnecting the traction wheels and drum to revolve the drum reversely of the direction of movement of the support frame and at a greater peripheral speed than the speed of movement of the support frame, a hopper on the support frame rearwardly of the drum, a rotary brush on the forward end of the hopper adjacent the top of the drum, and gearing interconnecting the drum and brush to rotate the brush oppositely to the rotation of the drum and at a greater speed of rotation than the drum.

3. In a "down" cotton salvaging machine, as a subcombination, a cylinder of a length to span the space between adjacent rows of cotton stalks and having a diameter substantially in excess of 12 inches, and a multiplicity of cotton impaling elements anchored to the periphery of said cylinder and arranged in a spiral row, said elements spaced apart equidistantly in said row approximately three inches, the pitch of said row being such that adjacent impaling elements are spaced apart approximately one inch axially of the cylinder, each impaling element being generally L-shaped and including a radial arm anchored to said periphery and projecting about two inches therefrom, a transverse extension on said arm approximately one inch in length and approximately parallel to said periphery and spaced therefrom and secured to the outer end of said arm and facing in the direction of rotation of said cylinder during operation of said machine, and an inwardly directed short substantially radial cotton impaling point on the free end of said transverse extension facing said periphery and in spaced substantially parallel relation to said radial arm of the impaling element and adapted to snag cotton on the ground near the bottom of said cylinder and to reject and cast aside debris.

References Cited in the file of this patent
UNITED STATES PATENTS

| 1,439,266 | Shaw | Dec. 19, 1922 |
| 2,155,543 | Grignolo | Apr. 25, 1939 |